(12) United States Patent
Schnuckle et al.

(10) Patent No.: US 7,261,455 B2
(45) Date of Patent: Aug. 28, 2007

(54) SYSTEM AND METHOD FOR GENERATING A FLICKERING FLAME EFFECT

(75) Inventors: Gary Schnuckle, Altadena, CA (US); Holger Irmler, Studio City, CA (US); Alfredo Ayala, West Covina, CA (US); Jamie Robertson, Wayland, MA (US); Bryan S. Tye, Canyon Country, CA (US)

(73) Assignee: Disney Enterprises, Inc., Burbank, CA (US)

( * ) Notice: Subject to any disclaimer, the term of this patent is extended or adjusted under 35 U.S.C. 154(b) by 380 days.

(21) Appl. No.: 11/035,653

(22) Filed: Jan. 13, 2005

(65) Prior Publication Data

US 2006/0034100 A1  Feb. 16, 2006

Related U.S. Application Data

(63) Continuation-in-part of application No. 10/915,794, filed on Aug. 10, 2004, now Pat. No. 7,159,994.

(51) Int. Cl.
  *F21V 33/00*  (2006.01)
(52) U.S. Cl. ............... 362/569; 362/810; 362/605; 362/555; 362/161; 362/319
(58) Field of Classification Search ............ 362/810, 362/605, 555, 569, 161, 319, 362
  See application file for complete search history.

(56) References Cited

U.S. PATENT DOCUMENTS

| 2,435,811 A | 2/1948 | Waters |
| 2,976,450 A | 3/1961 | Benoleil et al. |
| 3,233,093 A | 2/1966 | Gerlat |
| 3,384,774 A | 5/1968 | English |
| 3,514,660 A | 5/1970 | Kopelman |
| 3,639,749 A | 2/1972 | Beckman |
| 3,681,588 A | 8/1972 | Lee |
| 4,328,534 A | 5/1982 | Abe |
| 4,477,249 A * | 10/1984 | Ruzek et al. ............... 431/253 |
| 4,551,794 A | 11/1985 | Sandell |
| 4,617,614 A | 10/1986 | Lederer |
| 4,777,571 A | 10/1988 | Morgan |
| 4,866,580 A | 9/1989 | Blackerby |
| 4,965,707 A | 10/1990 | Butterfield |
| 5,097,180 A | 3/1992 | Ignon et al. |
| 5,381,325 A | 1/1995 | Messana |
| 6,257,755 B1 | 7/2001 | Sevelle |
| 6,302,555 B1 | 10/2001 | Bristow |
| 6,312,137 B1 | 11/2001 | Hsieh |
| 6,454,425 B1 | 9/2002 | Lin |

(Continued)

FOREIGN PATENT DOCUMENTS

JP  06052709  2/1994

*Primary Examiner*—Sandra O'Shea
*Assistant Examiner*—Anabel Ton
(74) *Attorney, Agent, or Firm*—Marsh Fischmann & Breyfogle LLP; Kent A. Lembke

(57) ABSTRACT

A system for creating a flickering effect comprising a simulated candle housing, a light communicating channel on the housing, a source of ultraviolet light disposed in the channel, and a simulated flame having ultraviolet material thereon movable back and forth from its vertical axis mounted in the housing, the light focused on the simulated flame simulating a flickering flame.

18 Claims, 11 Drawing Sheets

U.S. PATENT DOCUMENTS

| | | |
|---|---|---|
| 6,461,011 B1 * | 10/2002 | Harrison ................ 362/96 |
| 6,511,219 B2 | 1/2003 | Sevelle |
| D486,924 S | 2/2004 | Skradski et al. |
| 6,688,752 B2 | 2/2004 | Moore |
| 6,712,493 B2 * | 3/2004 | Tell et al. ................ 362/565 |
| 2002/0080601 A1 | 6/2002 | Meltzer |
| 2003/0041491 A1 | 3/2003 | Mix |
| 2003/0053305 A1 | 3/2003 | Lin |
| 2004/0165374 A1 | 8/2004 | Robinson |

* cited by examiner

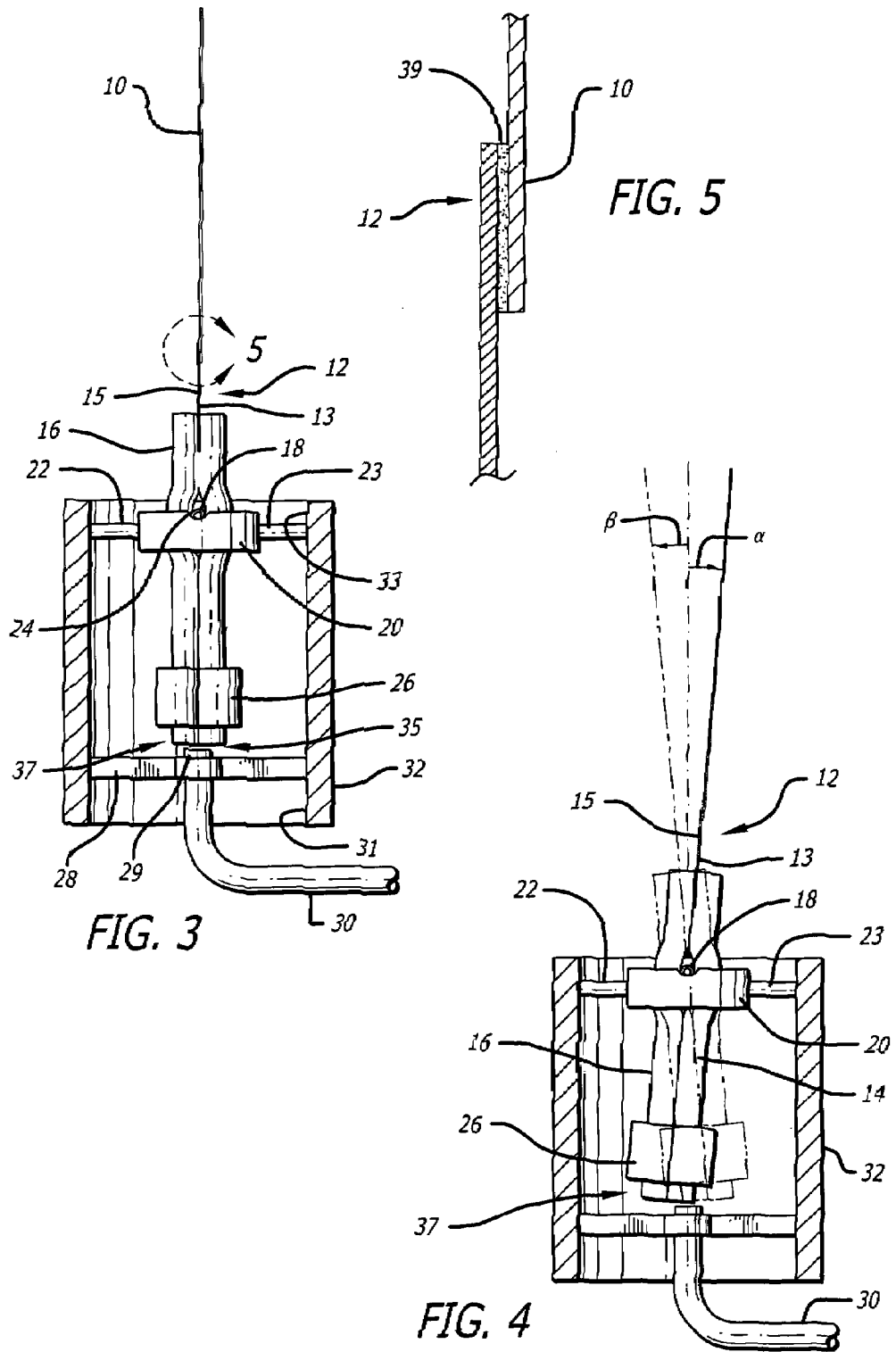

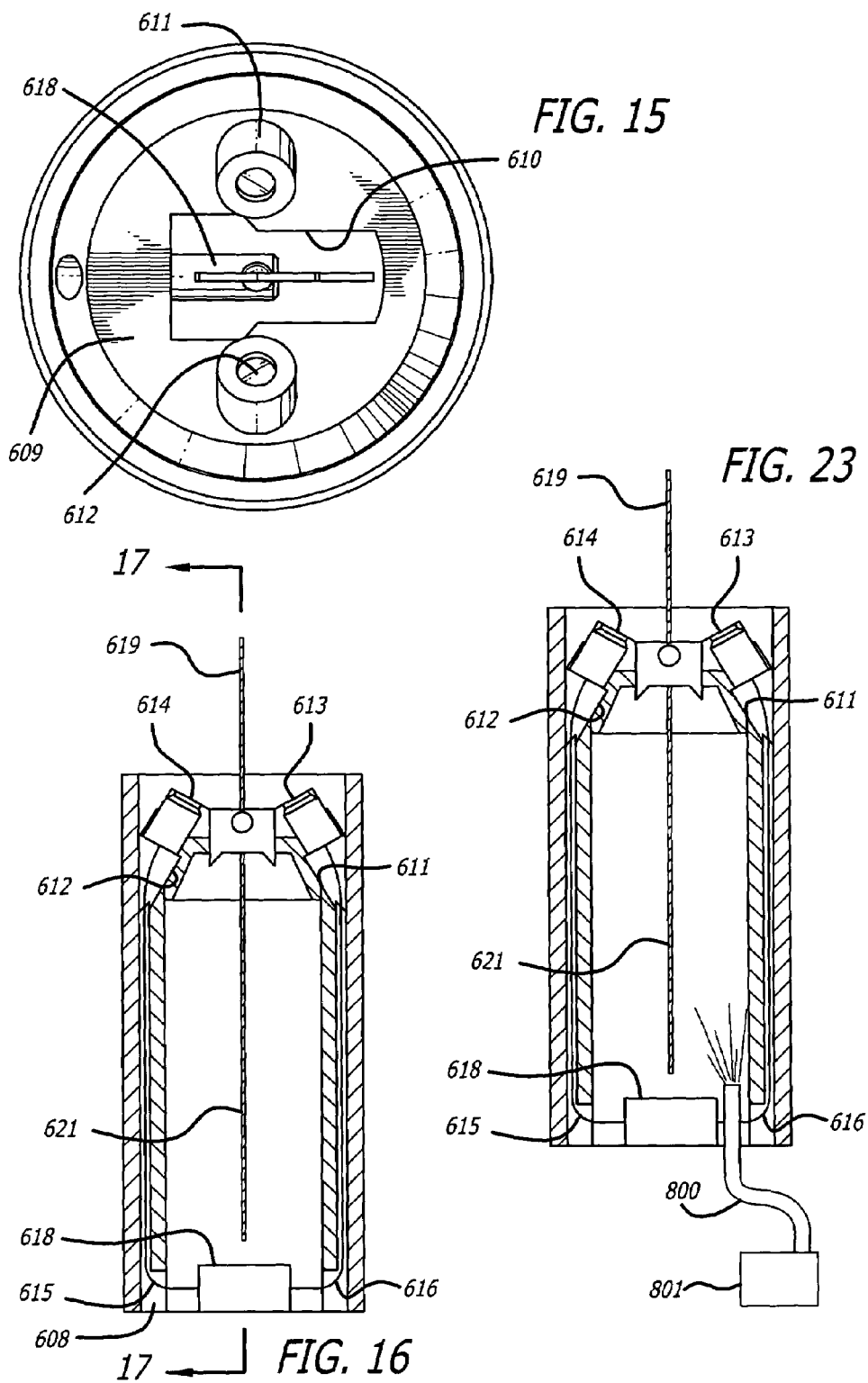

SYSTEM AND METHOD FOR GENERATING A FLICKERING FLAME EFFECT

CROSS-REFERENCE TO RELATED APPLICATIONS

This application is a continuation-in-part of application Ser. No. 10/915,794 filed Aug. 10, 2004 now U.S. Pat. No. 7,159,994.

BACKGROUND

The present disclosure relates generally to the creation of artificial light effects for entertainment and novelty applications.

DESCRIPTION OF THE BACKGROUND ART

The generation of a flickering flame effect is important in entertainment applications, since it provides a mechanism for simulating the flicker of a candle without actually using a candle. This is important since it provides numerous safety benefits as well as an ability to keep the artificial flame "burning" in the presence of significant air pressure variations.

One type of device that generates an artificial flame is commonly known as a "wiggle wire ball." Specifically, this device is a relatively large ball that has a flat filament, wherein the current in the filament takes a random path which alters from time to time, thereby simulating a flickering flame effect.

Another such device includes a series of orange and white LEDs that are cast in resin having a flame shaped surface. A current supplied to the LED's in a particular sequence gives rise to a flickering flame effect.

Yet another device is commonly referred to as a "silk flame." The silk flame includes a piece of silk that is blown upwards by a fan, causing it to undulate. A light projected on the silk piece is reflected off of the silk while it is moving, thereby creating a flickering flame effect. Another device for generating an artificial flickering flame effect is a lamp having a flicker circuit, wherein the flicker circuit is used to modulate the glowing light source within the bulb, thereby giving an appearance of a candle burning inside a lantern or a sconce.

Another flickering flame device is a light bulb inside a flame shaped plastic object, which has wires incorporated into it. The wires interact with electromagnets causing the flame shaped object to tilt from side to side under control of an electronic circuit.

SUMMARY

The foregoing devices are either bulky, unsafe or do not provide a realistic flickering flame effect. Thus, the system discussed below includes an apparatus and a method for synthesizing an artificial flame that provides a realistic flickering flame effect that is safe and easy to manufacture.

In U.S. patent application Ser. No. 10/915,794, there is disclosed an artificial flickering effect that simulates the flickering of a candle flame. In this aspect, the apparatus comprises: (i) at least one light communicating channel, (ii) a flame shaped surface in communication with a first end of the at least one light communicating channel, (iii) a mount for rotatably securing the at least one channel, (iv) a fiber optic cable spaced from the at least one channel for delivering the light signal to a second end of the at least one channel, wherein the rotation of the at least one channel about at least one axis of the mount creates an artificial flickering flame on the flame shaped surface. Additionally, the at least one channel may be designed to rotate about the orthogonal axes of the mount. The apparatus may further comprise a thin rod in communication with the flame shaped surface, wherein the rod is sensitive to air pressure variations, thereby causing the flame shaped surface to rotate about the orthogonal axes of the mount.

In still another aspect of the invention, in application Ser. No. 10/915,794 a flame portion simulating a candle flame is provided with an ultraviolet coating and, under illumination from an ultraviolet LED light source, oscillates back and forth at the top of a simulated candle.

In another aspect of the system, disclosed in application Ser. No. 10/915,794, a method for generating diffused light is disclosed comprising: (i) receiving a light signal at a first end of an at least one fiber optic channel, wherein the at least one channel is rotatably secured on a mount and wherein the at least one fiber optic channel rotates about at least one axis of the mount, (ii) delivering the light signal to a diffuser surface which is in communication with a second end of the at least one channel, wherein the rotation of the at least one fiber optic channel about an least one axis of the mount creates diffused light about the diffuser surface. Additionally, the method may further include the steps of rotatably securing the ring to a cylindrical enclosure surrounding the ring and providing a light signal from a light source, wherein the light source is a light-emitting diode (LED).

In the instant application, ultraviolet LEDs are used to focus ultraviolet light and a simulated flame having ultraviolet material thereon which oscillates back and forth to simulate a flickering candle flame.

BRIEF DESCRIPTION OF THE DRAWINGS

FIG. 3 is a view taken along line 3-3 of FIG. 2;

FIG. 4 is a view similar to the FIG. 3 illustrating the displacement of the flame shaped surface and associated components of the device of FIG. 2 during a flicker event;

FIG. 5 is a cross sectional view of the device of FIG. 3 taken along line 5 of FIG. 3;

FIG. 15 is a top plan view of the candle of FIG. 13;

FIG. 16 is a cross-sectional view of the candle of FIG. 13;

FIG. 23 is a view similar to FIG. 16 illustrating an added feature of the invention.

DESCRIPTION OF THE EMBODIMENTS

Although specific embodiments of the present disclosure will now be described with reference to the drawings, it should be understood that such embodiments are by the way of example only and merely illustrative of but a small number of the many possible specific embodiments which can represent applications of the principles of the present disclosure. Various changes and modifications obvious to one skilled in the art to which the present disclosure pertains are deemed to be within the spirit, scope and contemplation of the present disclosure as further defined in the appended claims.

Figure 1:
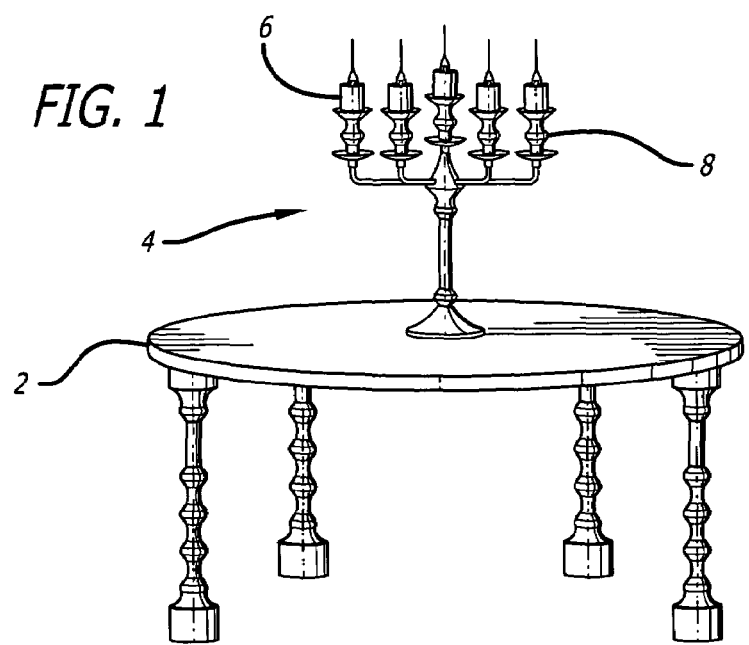
FIG. 1 is a perspective view of a candelabrum holding several artificial flame devices according to an embodiment of the disclosure, appearing as candles.

FIG. 1 is an exemplary depiction of a candelabrum 4 holding several artificial flickering flame devices 6 mounted on a table 2. The devices 6 are shown as candle shaped and are positioned on individual supports 8 of the candelabrum 4. Of course, the devices 6 may be other shapes, and need not resemble cylindrical candles per se, but could be any whimsical or geometric shape, just as candles can be found in myriad shapes, such as cartoon figures, pyramids, motor vehicle shapes, flowers, sculptures etc. Furthermore, the candelabra and table 2 are not necessary and any suitable support may be used. An artificial flame device 6 may also be fully or partially enclosed within a surrounding structure, such as in a globe or other container.

Figure 2:
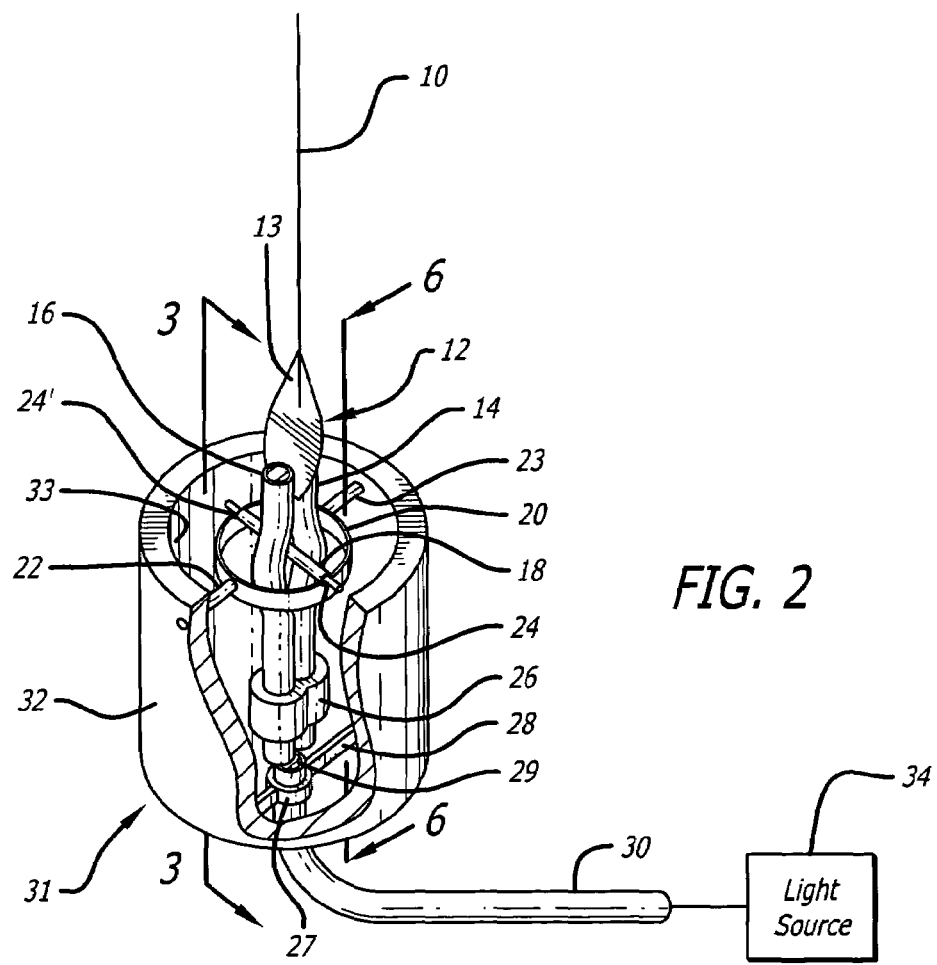
FIG. 2 is a cut away perspective view of one of the artificial flame devices of FIG. 1.

FIG. 2 is a view of one of the artificial flicker flame device 6 of FIG. 1. In this embodiment, the artificial flickering flame effect is created through air-pressure variations applied to the reflecting surfaces 13, 15 (see also FIG. 3) of element 12, which may be somewhat flame shaped, FIG. 2, and/or to the stem 10 attached to element 12 and extending generally upwardly therefrom. In other words, air moving against the components, such as airflow created by a fan, or air injected upwardly through the open bottom of the candle housing in any suitable manner, such as an air tube, which thus causes the components to move on a gimbal mechanism, as described below.

The device in FIG. 2 may comprises a generally cylindrical housing 32 open at both ends 31, 33, respectively (see also FIG. 3). A light conduit 30, such as a fiber optic cable, FIG. 2, is positioned near a light source 34, and is held in position in open end 31 by a support frame 28. Support frame 28 includes a central hub 27, through which conduit 30 extends, and at least two outwardly oppositely extending arms 28 fixed to hub 27 and the inner wall of housing 32.

A gimbal mechanism is mounted in the open end 33 of housing 32 having a ring-shaped member 20. Ring-shaped member 20 is supported within housing 32 by a pair of pins 22, 23, respectively, each pin 22, 23 being fixedly secured to the outer periphery of member 20 and rotatably secured to the inner wall of housing 32. The pins 22 and 23 thus permit the member 20 of the gimbal mechanism to rotate about the longitudinal axes of the pins 22 and 23.

The member 20 includes a pair of spaced grooves 24 and 24' on its upper surface. A rod 18 is disposed in the grooves 24, 24' and acts as a support for mutually communicating cables that are designed to carry a light signal, such as optical cables 14 and 16.

The cables 14, 16 rotate about at least one axis (viz., the longitudinal horizontal axis passing along the length of the rod 18, as seen in The cables 14 and 16 (FIG. 2) may be coupled together by a connector 26 through which they extend (see also FIG. 2). Positioned in between the two cables 14 and 16 is a teardrop shaped element 12, simulating a flame. Element 12 may be made of plastic, rubber, or any other composite material, either substantially transparent or opaque material, and may be appropriately colored to heighten the perception of a flickering flame effect. Additionally, a substantially long thin wire or stem 10 may be attached by any suitable means to the flame shaped element 12 to create a wispy smoke effect.

As seen in FIG. 3, a gap 35 separates the light carrying cable 30 from the light carrying cables (14, 16), the flame shaped element 12, the member 20 and pins 22, 23.

The rotation of the gimbal mechanism 20, 22, 23 and the mutually connected light carrying cables (14, 16), along with the flame shaped element 12 and member 20 about rod 18, causes the lower end of the mutually connected cables (14, 16) to be displaced from their stationary position of FIG. 3 to the positions illustrated in the dotted lines in FIG. 4.

FIG. 5 illustrates how element 12 is bonded to the stem 10 which is in the form of a thin rod, by any suitable adhesive 39.

Figure 6:
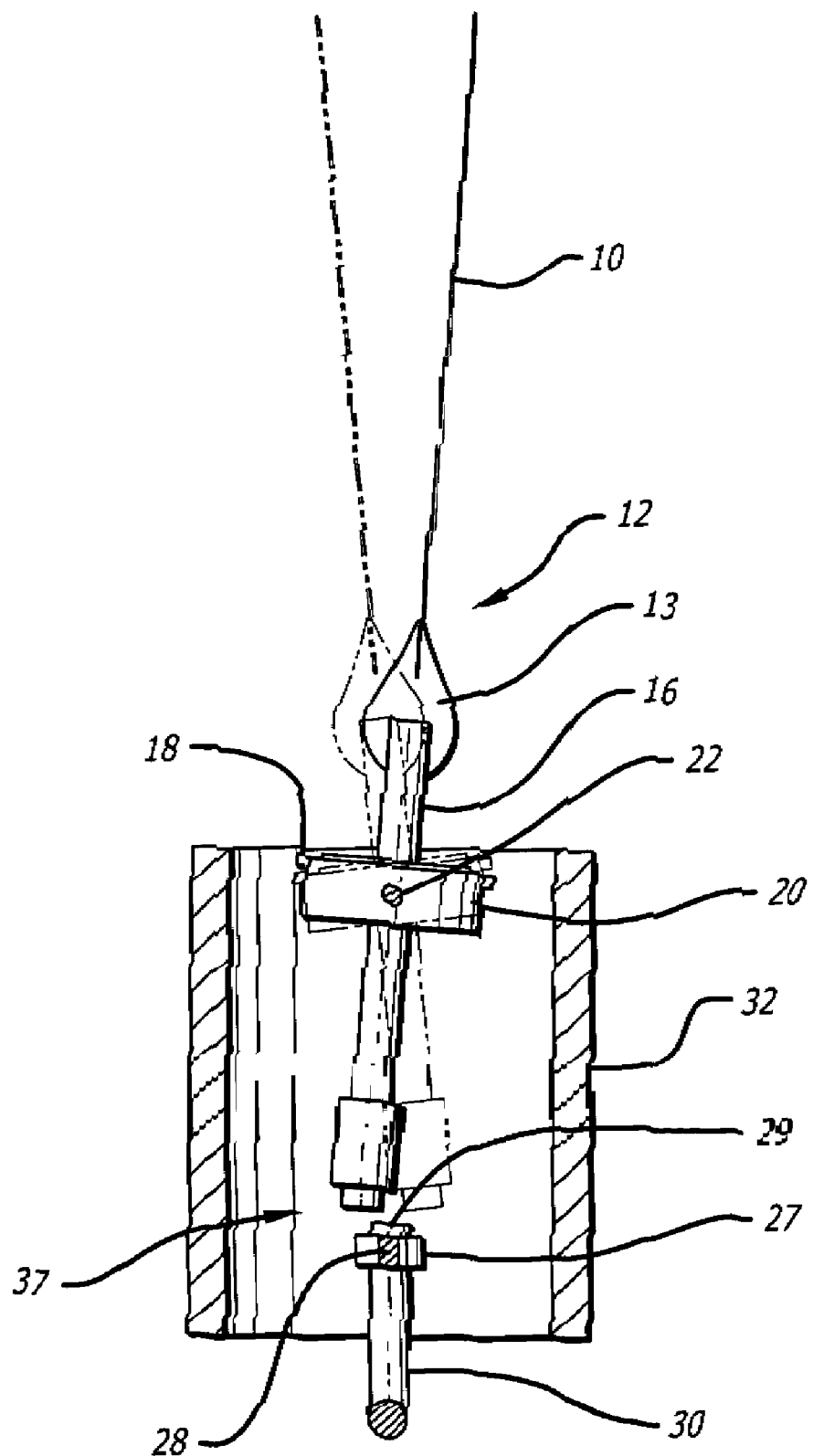
FIG. 6 is a view taken along line 6-6 of FIG. 2.

FIG. 6 illustrates the rotation of the structure comprising the gimbal mechanism (20, 22, 23), and the mutually connected light carrying cables (14, 16), and the flame shaped element 12 about an horizontal axis passing through pins 22 and 23. This causes the lower end 37 of the connected cables (14, 16) to be displaced from the stationary position of FIG. 3. As heretofore mentioned, the same effect occurs along the axis of rod 18 as discussed with respect to FIG. 4.

Thus, in summary, there are at least two degrees of rotation in the artificial candle (viz., rotation of the flame shaped element 12 about rod 18, and rotation of the flame shaped element 12 about the pins 22, 23).

The operation of the artificial candle 6 for creating a flicker flame effect is described as follows. A light signal, generated by a light source 30, propagates through the optical cable 30, and is emitted at one end 29 of the cable 30 into the air gap 35, which may be about 80 thousandths of an inch wide. In a stationary condition (i.e., when there is substantially no displacement of the thin rod 10), the light arriving from cable 30 is delivered to at least one of the two mutually connected cables (14, 16). The light carried by at least one of the two cables (14, 16) is then delivered to at least one face 13 or 15 of the flame shaped element 12 presenting the perception of a flame. In the condition where air-pressure variations induce motion of the structure comprising (i) the gimbal mechanism (20, 22, 23), (ii) the mutually connected light carrying cables (14, 16), and (iii) the flame shaped element 12, movement of the lower end 37 of the cables (14, 16) away from the stationary state will cause light to reflect or diffuse, completely or partially, on at least one of the faces of the flame shaped surface, thereby creating an artificial flickering flame effect.

Specifically, FIG. 3 shows a stationary state situation where light arriving via the optical cable 30 is delivered to both of the mutually connected cables (14, 16) via the gap 35. Subsequently, the light signal propagates through both of the mutually connected cables (14, 16) towards the flame shaped element 12 to be reflected or diffused about both faces 13 and of element 15, thereby giving the appearance of a flame.

As shown in FIG. 4, when there is a substantial rotational movement by an angle □ about rod 18 (i.e., the angle between the vertical and thin stem 10) 18, of the structure comprising: (i) the gimbal mechanism (20, 22, 23), (ii) the mutually connected light carrying cables (14, 16), and (iii) the flame shaped element 12, the lower portion of the mutually connected cables is displaced from its stationary position (FIG. 3) in a manner that light from the cable 30 is reflected off face 13 of the flame shaped element 12. In the case where the rotational angle □ is large, the light is attenuated significantly (as it does not propagate through cable 14) and hence there is a lower reflection off of face 13.

Figure 7:
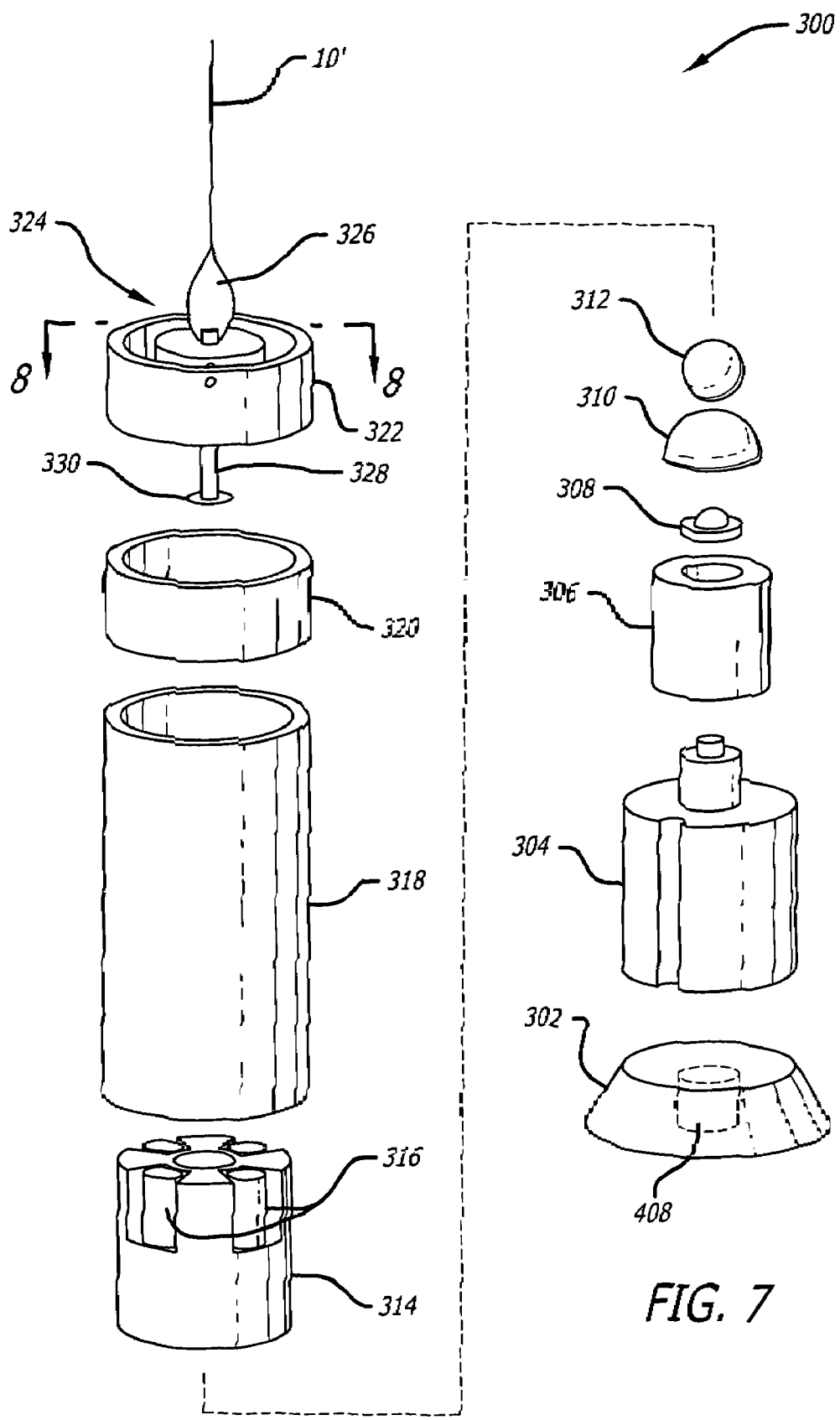
FIG. 7 is an exploded view of an artificial flame candle according to another embodiment of the disclosure.

In another exemplary embodiment, an artificial candle 300, as shown in FIG. 7, includes a control board 302 having suitable electronics (e.g., current pulsing circuits, memory module, micro-controller, portable power source, power converter, etc.), represented by microcontroller 408, a solid state device (e.g., an LED) 308 positioned on a mount 306, and a heat sink 304 for efficient extraction of heat from the LED 308. At least one lens system (shown herein as two separate lenses, such as condenser lens 310 and ball lens 312 in one exemplary aspect) is positioned on the mount 306 to allow optimal focusing of the LED light output. Electromagnets 316 may be positioned on a base 314 for generating an electromagnetic field. A tube 318, which may be of a composite material of nylon and aluminum, provides a guiding means for the light arriving from the LED system. In one aspect, the combination of the control board 302, the heat sink 304, the solid state device 308 (including mount 306 and lenses 310, 312), and the electromagnets 316 may be housed inside the tube 318.

Figure 8:
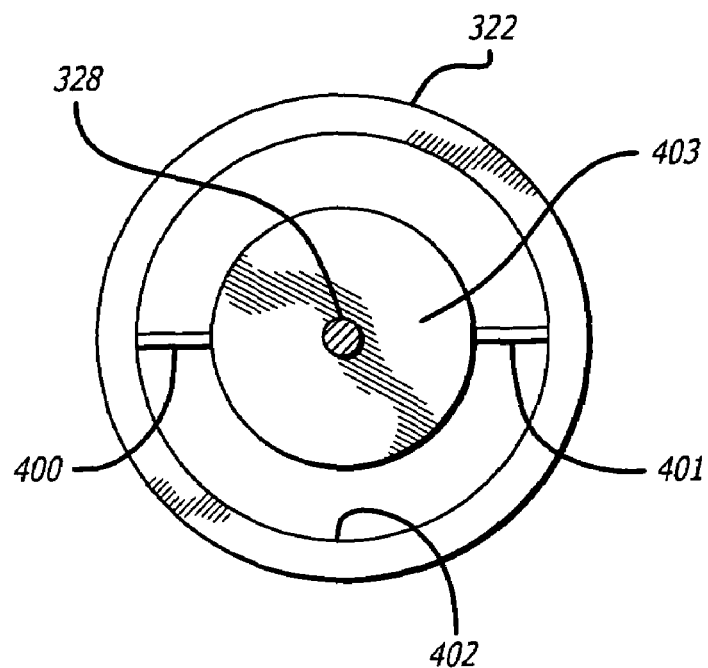
FIG. 8 is a view taken along lines 8-8 of FIG. 7.

A gimbal structure 324, having a cylindrical housing 322, may be in contact with a spacer 320 for substantially separating the gimbal structure 324 from the tube 318, in order to allow optimal projection of the light output from the LED system onto the flame shaped element 326 (similar to element 13 of FIG. 1). A rod 328 which may be solid or hollow, with a base 330, is in communication with the flame shaped element 326 and allows light to be conducted or delivered onto the reflecting surfaces of element 326. It is to be understood that housing 322 has a pair or outwardly extending pins 400, 401 (see FIG. 8) rotatably secured to both the inner wall 402 of cylindrical housing 322 and inner cylindrical member 403 having rod 328 extending therethrough and reciprocal therein. Thus, rod 328, and element 326, move about the elongated axes of pins 400, 401 and up and down within member 403.

A thin member 10, FIG. 7, similar to member 10 of FIG. 1, may be fixed to element 326 extending upwardly therefrom.

The operation of the artificial flame candle 300 is as follows. The desired movement pattern of the flame shaped surface 326 may be encoded and stored in the memory module 408 of the control board 302 in the form of digital data or control signals. The control board 302 may include a micro-controller (not shown), which excites the electromagnets 316 based on the encoded digital data arriving from the memory module 408 on the control board 302. Specifically, the electromagnets 316 are arranged on the base 314 and are excited by the signal from the control board 302 to create a field with a certain polarity around the electromagnets 316. In one aspect, the digital data may be programmed from an external computer (not shown). Furthermore, the control board 302 may be either battery operated (e.g., with a 5V battery) or it could be energized through an AC power supply.

The magnetic base 330 will either move away or towards the electromagnets 316 depending on whether the electromagnetic field is of the same polarity as the base 330 or not. The movement of the magnetic base 330 towards or away from the electromagnets 316 will induce a rotational motion of the gimbal structure 324 about the horizontal (or vertical) plane. Due to this rotational motion of the gimbal structure 324, light arriving from the LED 308 will be reflected, completely or partially, off at least one of the faces of the flame shaped surface 326, thereby creating an artificial flicker flame effect.

Figure 9:
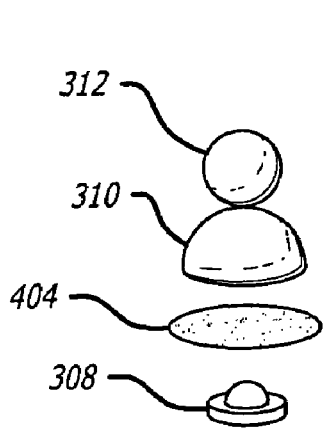
FIGS. 9 and 10 are exploded views of a portion of the candle of FIG. 7 showing two modifications thereof.
Figure 10:
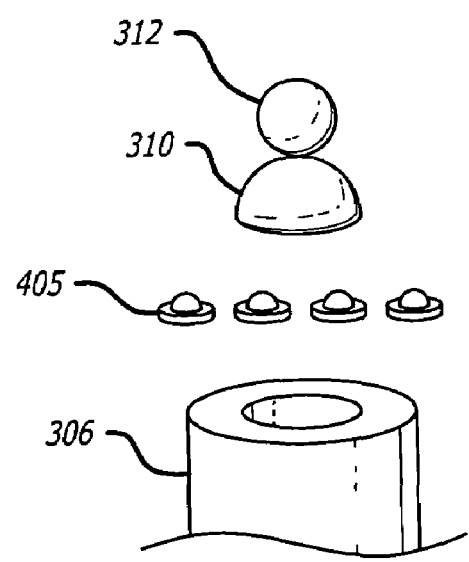

In another embodiment, a dichroic filter 404 (FIG. 9-like numerals referring to like parts of FIG. 7) may be positioned between the LED 308 and the condenser lens 310. The dichroic filter 404 alters the wavelength of the LED light output signal, rendering the light output to be of arbitrary color, thereby allowing the artificial flickering flame to be of any color. Alternatively, as seen in FIG. 10, wherein like numerals refer to like parts of FIGS. 7 and 8, an array 405 of LED's having different operating wavelengths may be housed on the LED mount 306, and electronic switching (not shown) of the array 405 of the LED's may permit arbitrary an color flickering flame effect.

Figure 11:
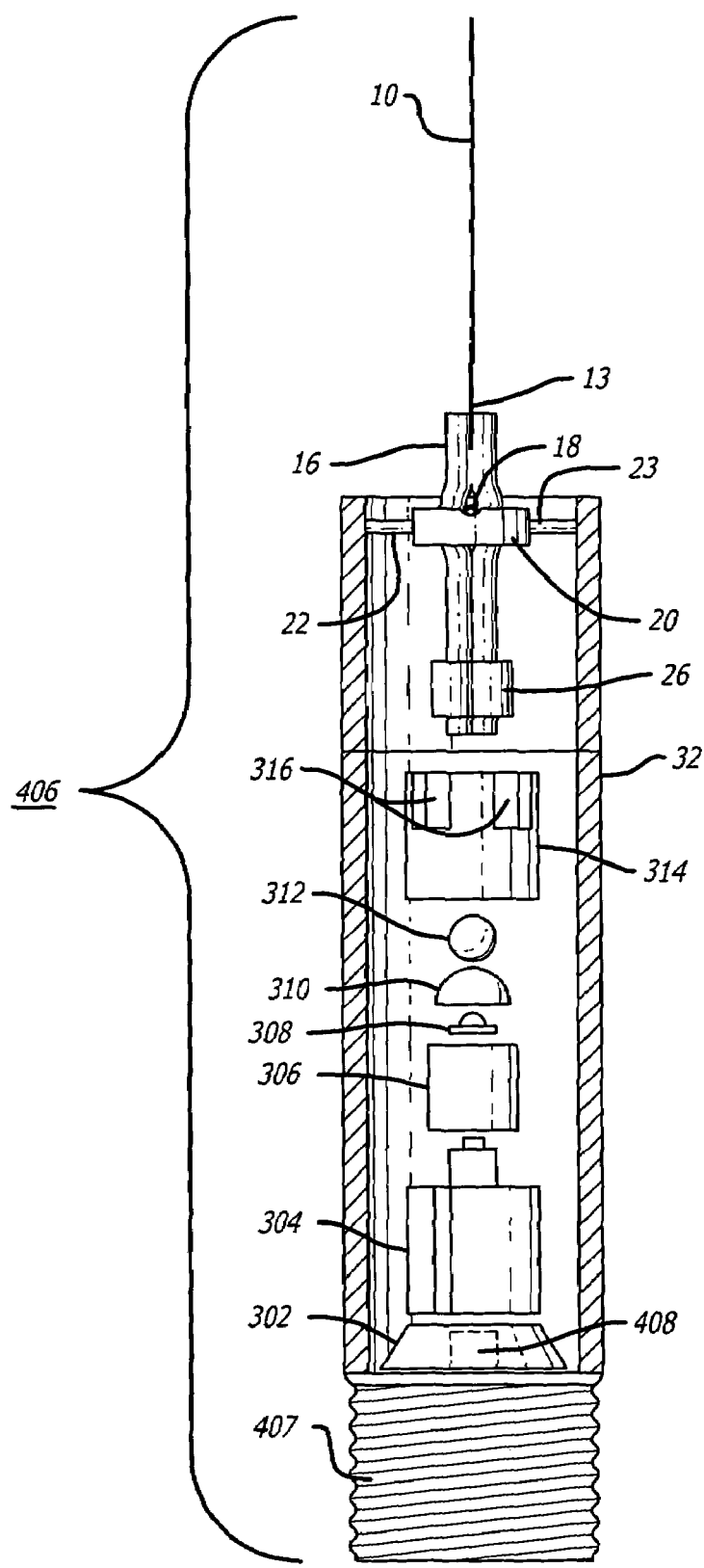
FIG. 11 is an elevational view, partly in section, of another embodiment of the candle of FIG. 7.

It is to be understood that other embodiments may be utilized and structural and functional changes may be made without departing from the respective scope of the disclosure. Possible modifications to the system include, but are not limited to, including the solid-state device 308, the condenser lens 310 and ball-lens 321 of FIG. 7 in the embodiment of FIG. 2. This is shown in the candle 406 of FIG. 11 wherein like numerals refer to like parts of FIGS. 2 and 7. Although particular embodiments have been disclosed, variations thereof may occur to an artisan and the scope of the disclosure should only be limited to the scope of the appended claims. The artificial candle 406 may have the control board 302 within a unitary structure inside of candle 406 or the control board 302 may be external to the artificial candle (not shown). The artificial candle 406 could also have a light bulb screw end 407 to secure the candle 406 to a base (not shown).

Figure 12:
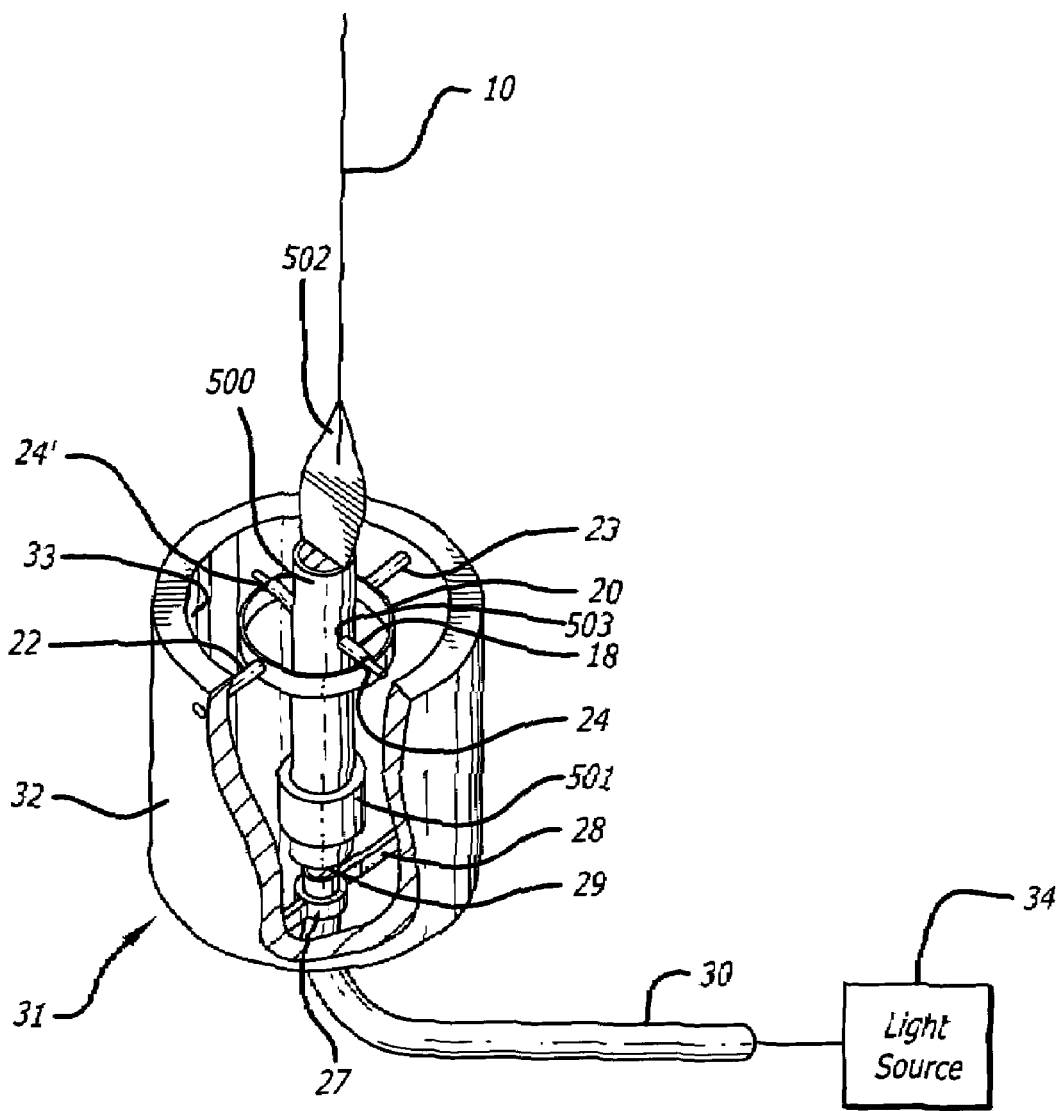
FIG. 12 is a perspective cutaway view of another modification of a flame device in accordance with the invention.

Although the flame device in FIG. 2 shows a pair of cables or light transmitting channels, a single light transmitting channel may be used. Thus, as seen in FIG. 12, wherein like numerals refer to like parts of the embodiment of FIG. 2, a single light transmitting or light carrying channel 500 is shown in place of cables 14, 16. A teardrop shaped element 502, identical to element 12 in FIG. 2, is secured in any suitable manner to the upper end of channel 500. Rod 18 now passes through hole 503 in channel 500. The operation of channel 500 is otherwise identical to the movement of cables 14, 16.

It can be seen that there is disclosed a flame shaped reflector or diffuser integrated with a light pipe (single or multi-channel) which is articulated by a natural and chaotic external or internal force (such as wind, magnetism); above one or more collimated light sources (e.g. fiber optic, LED, incandescent). The reflector or diffuser is balanced with its center of gravity (or movement between the reflector/diffuser and the light source) on a gimbal mechanism allowing movement on a minimum of two axes. The reflector or diffuser moves randomly simulating blowing in the wind.

Figures 13, 14:
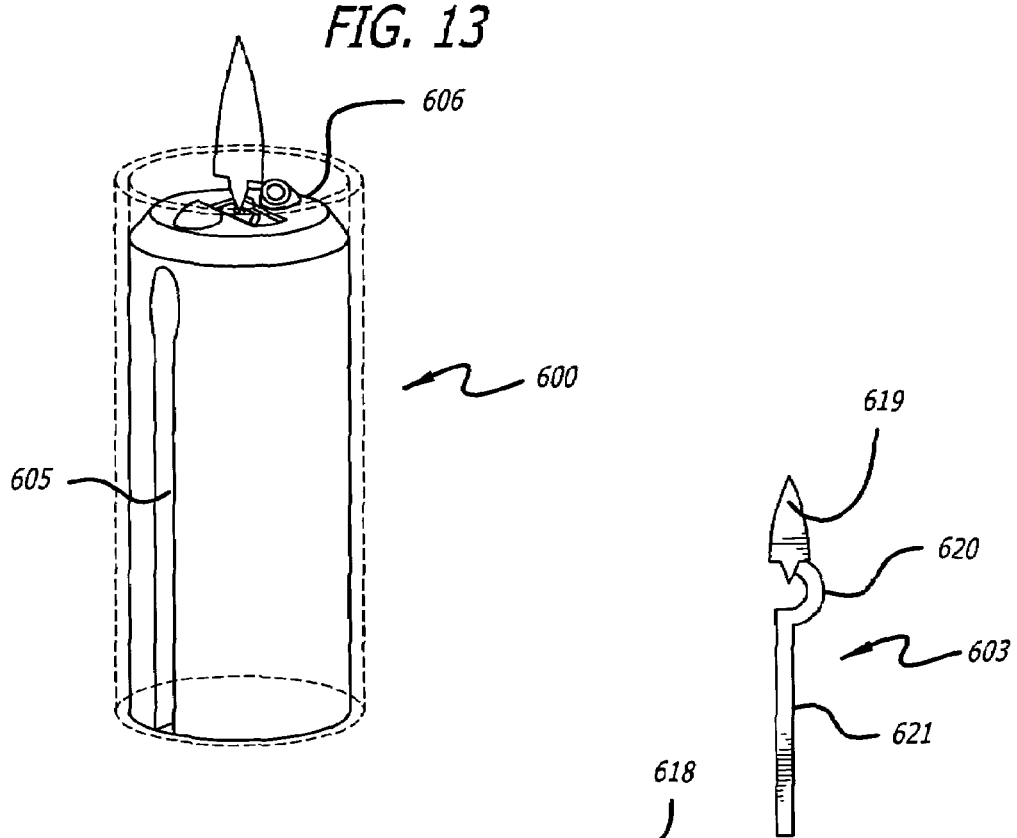
FIG. 13 is an elevational view of another type of candle in accordance with the teachings of the invention.
FIG. 14 is an exploded view of the candle of FIG. 13.

In another embodiment of the invention, as shown in FIG. 13, a single candle 600 is shown having an outer translucent base cover 601 (see FIG. 14), open at both ends and generally cylindrical, an inner candle base 602, and a flame assembly 603. Base 602 is preferably opaque and preferably of a dark material and open at bottom 604. Base 602 is also generally cylindrical and press fit into base cover 601.

As seen in FIGS. 13 and 14, a plurality, such as two, of elongated channels or grooves 605, 606 are formed along the outer external surface 607 of candle base 602. Both grooves 605, 606 terminate at bottom before the terminal end of base 602 to provide exits at open slots 608 for electrical wires (not shown) as will be discussed.

The upper end or upper wall 609 of base 602 (see FIG. 15) has a generally T-shaped slot 610 therethrough. Wall 609 is of a thickness to accommodate two spaced angular holes 611, 612 extending from the upper ends of each groove 605, 606. That is, each groove 605, 606 has an enlarged opening 613 (FIG. 14) at its upper end with holes 611, 612 extending upwardly therefrom (see also FIG. 16) at an angle to the longitudinal axis of base 602 opening at top as seen in FIG. 15.

An ultraviolet LED, such as LEDs 613, 614, is mounted in each hole 611, 612, respectively (see FIG. 16). These LEDs are angled upwardly to project cones of ultraviolet light when activated. Electrical wires 615, 616 are connected to LEDs 613, 614, respectively, and are trapped between the outer wall 607 of base 602 and the inner wall 617 (FIG. 14) of cover 601. Both wires 615, 616 extend out their respective slots 608 and are coupled to a suitable source of electrical power 618, such as a battery assembly. Of course, an external source of power may be used, such as the light source 34 in FIG. 2.

Referring again to FIG. 14, a flame rod or pin 618, which may be cylindrical and of a metallic material, such as brass, extends through a hole 619 through the wall of base 602 between holes 611, 612 and transverse to the central axis of base 602. As seen in FIG. 15, pin 618 extends across the wider portion of T-shaped slot 610 to generally the midpoint thereof.

Flame assembly 603 includes an upper flame portion 619 (FIG. 14), simulating a flame, an integral curved portion 620, and a downwardly extending elongated portion 621.

Portions 620, 621 may be of one piece material, such as plastic, and may be black in color. As can be seen in FIG. 16, portions 620, 621 may also be of a flat material. Flame portion 619 is secured to curved portion 620 in any suitable manner, as by gluing, and is also relatively thin as seen in FIG. 16. Flame portion 619 is preferably of an ultraviolet material, such as a plastic material, or may be of a suitable material, such as plastic, coated with an ultraviolet material.

Figure 18:
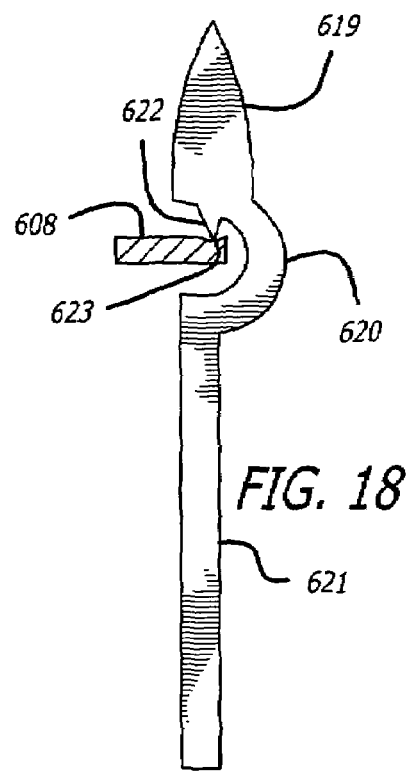
FIGS. 18 through 20 are detailed views of 3 different embodiments of the flame assembly alone of the candle of FIGS. 13 to 17.
Figure 19:
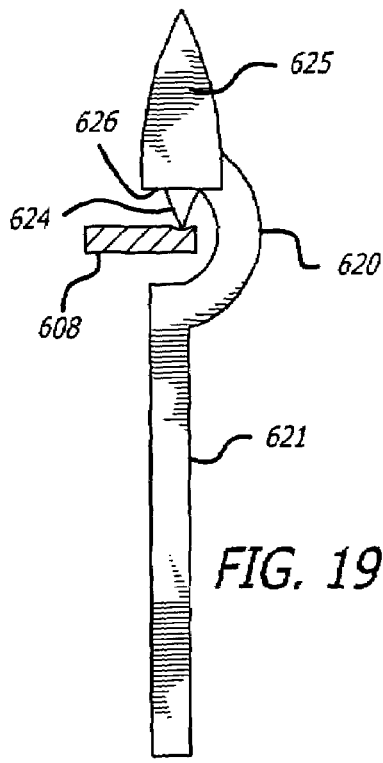
Figure 20:
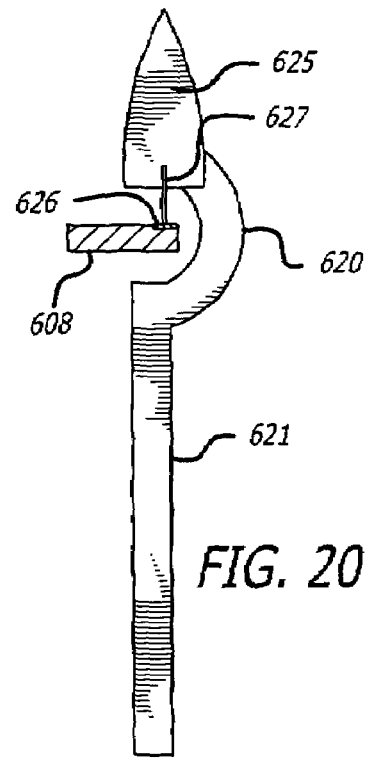

As seen in FIG. 18, the lowermost end of flame portion 619 terminates in a pointed end 622 which is adapted to enter a groove 623 in pin 608. Alternatively, as seen in FIG. 19, wherein like parts refer to like parts of the embodiment of FIG. 18, curved portion 620 may terminate in a downwardly extending point 624 with flame portion 625 being straight along its bottom 626. Point 624 is adapted to rest in groove 623 as seen in FIG. 18. In still another embodiment of the invention, as seen in FIG. 20 wherein like numerals refer to like parts of the embodiment of FIGS. 18 and 19, instead of a groove 623, a small magnet 626 is provided in pin 625 at the terminal end of a pin 627 extending upwardly and, secured to flame portion 625. Magnet 626 may be disposed on top of pin 625 or in a small cavity therein.

Figure 17:
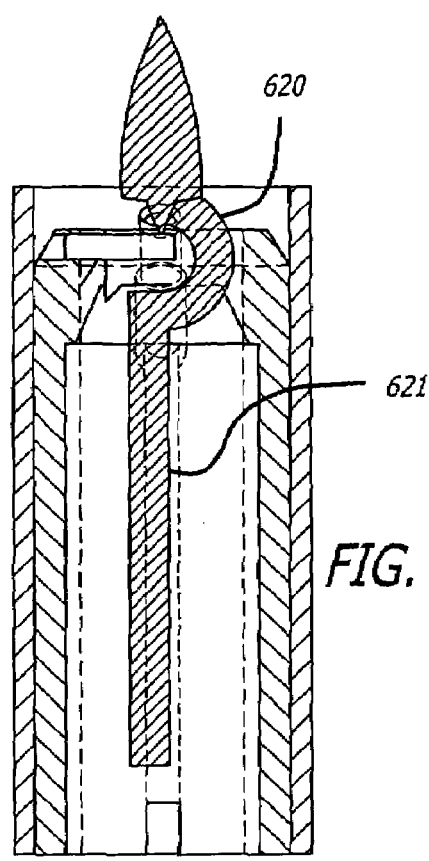
FIG. 17 is a cross-sectional view of the candle of FIG. 13 taken 90° from the cross-sectional view of FIG. 16.

As seen in FIG. 17, it can be appreciated that the pointed end 622 of flame portion 619 rests in groove 623 with curved portion 620 extending about pin 618 and down to portion 621. The width of flame portion 619 and curved portion 620 is such that the same will abut against the inner walls of slot 610 (FIG. 15) when they oscillate back and forth under air currents, wind, external fans, air from the bottom etc. The embodiments of FIGS. 19 and 20 will oscillate in like manner.

The LEDs, when illuminated, will focus on flame portions 619, 625 as they oscillate creating an ultraviolet light effect suggesting a flame.

Any suitable ultraviolet LEDs can be used, such as LEDs 5 mm in size and 385 nonometer UV LEDs. Any suitable materials may be used for the base 202 and cover 601. For example, Debrin translucent plastic, a trademarked plastic of E. I. du Pont de Nemours and Company, Corp. of Wilmington Del., may be used.

Angling of the LEDs as disclosed catches more reflected light.

Figure 21:
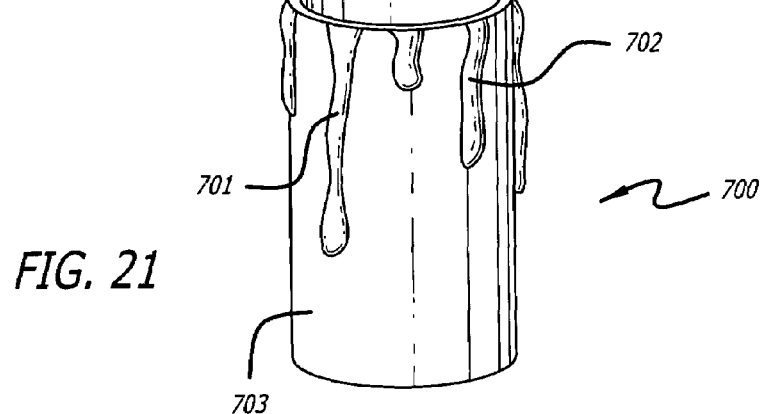
FIG. 21 is another embodiment of the cover alone of the candle of FIGS. 13 to 17.

As seen in FIG. 21, instead of cover 601, a cover 700 may be used of the same configuration and dimensions and material as cover 601. However, protrusions 701 and 702 of varying lengths and configurations may be provided on the outer surface 703 to simulate dripping wax. The simulated drippings ;may be of the same translucent material as cover 700.

Figure 22:
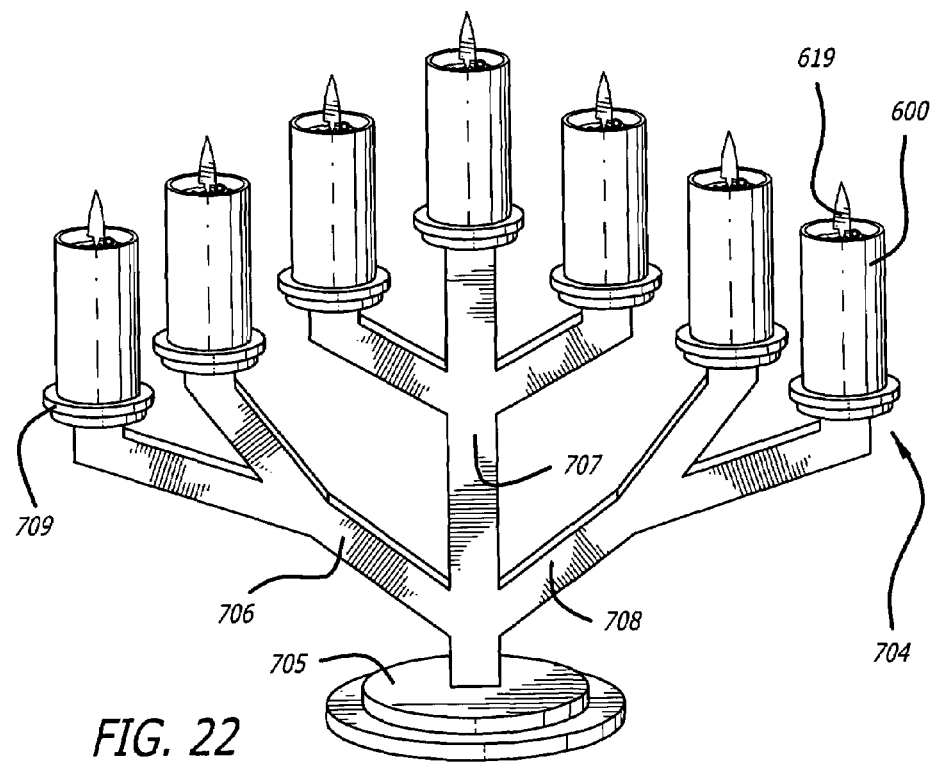
FIG. 22 is an elevational view of a candelabra incorporating the candle of FIGS. 13 to 17.

Although candles 600 may be used as self-supporting or standalone candles, as shown previously in FIG. 1, the candles 600 may be incorporated in a candelabra 704 having a base 705 and a plurality of upstanding spaced arms 706 to 708 terminating in candle holders 709, as shown, each supporting a candle 600. Normal air currents will cause the simulated flame to flicker. If desired, a source of air currents (Not shown), such as a fan, may be provided remote from candelabra 704 to "blow" the flame portions 619 as previously discussed. For example, as seen in FIG. 23, wherein like numerals refer to like parts of FIG. 16, a small air tube 800, coupled to a suitable source of air, such as an electrically activated blower 801, may be provided for blowing air upwardly through the interior of base 602. Of course, such a source of air may be provided in any one of the candles in this application. The wires (not visible in FIG. 22) may extend through the arms 706 to 708 to base 705 and may there be coupled to a suitable source of electricity (not shown in FIG. 22), and to a remote electrical outlet.

Although particular embodiments of the disclosure have been discussed, variations thereof may occur to an artisan and the scope of the invention should only be limited by the scope of the appended claims.

We claim:

1. A flickering flame simulation device comprising:
    an outer base cover;
    an inner candle base having an interior and an inner and outer wall, said base being disposed internally of said base cover, said base having an upper wall and a longitudinal axis;
    at least one elongated channel extending along the outer wall of said base;
    a slot extending through the upper wall of said base;
    a simulated flame assembly having a simulated flame portion having an upper end and a lower end;
    a source of light mounted in said channel focused on said flame portion;
    a pin extending through the outer wall of said base past the inner wall thereof into the interior of said base; and
    said simulated flame portion having a longitudinal axis and mounted on said pin so that said flame portion is movable toward and away from its longitudinal axis when subjected to air currents.

2. The device of claim 1 wherein said flame portion includes an ultraviolet material.

3. The device of claim 1 wherein said flame portion terminates at its lower end in a point resting in a groove in said pin.

4. The device of claim 1 wherein said pin is of a metallic material.

5. The device of claim 1 wherein said lower end of said flame portion is magnetically attached to said pin.

6. The device of claim 1 wherein air insert means is mounted internally of said base for blowing air upwardly within said base.

7. The device of claim 1 wherein said source of light in a light emitting diode (LED).

8. The device of claim 7 wherein said LED emits ultraviolet light.

9. The device of claim 1 wherein said source of light is at least one light emitting diode (LED) mounted in said channel angled inwardly toward the longitudinal axis of said base and focused on said flame portion.

10. The device of claim 9 wherein at least 2 channels with an LED mounted in each channel are provided on said base.

11. The device of claim 1 wherein said flame assembly includes a curved portion connected to said flame portion curving about said pin and extending downwardly within the interior of said base coincident generally with the longitudinal axis thereof.

12. The device of claim 11 wherein said slot has an inner wall and is generally T-shaped having a first wide end and a second narrow end, said pin extending generally along said wide end to generally the intersection of said wide end with said narrow end, said flame portion mounted to said pin at generally the intersection of said wide end with said narrow end.

13. The device of claim 11 wherein said flame portion is movable within said slot from a first position abutting against a first point on the inner wall of said slot at said narrow end to a second position abutting against a second point on the inner wall of said slot opposite said first point.

14. The device of claim 10 wherein said base cover is of a translucent material.

15. The device of claim 14 wherein said base cover has an outer surface with irregularly shaped protrusions on its outer surface simulating wax drippings.

16. The device of claim 15 wherein said protrusions are of translucent material.

17. The device of claim 1 wherein a plurality of said devices are mounted on a candelabra.

18. The device of claim 17 wherein said devices are vertically mounted on said candelabra at differing heights thereof.

* * * * *